United States Patent Office 3,573,024
Patented Mar. 30, 1971

3,573,024
DEVICE FOR CONTINUOUS STRETCHING OF GLASS CAPILLARIES WITH AN ENAMEL BAND
Oleg Alexandrovich Golozubov, Novye Kuzminki, Kvartal 118, korpus 38, kv. 70, Moscow, U.S.S.R., and Vladimir Ioganovich Kalganov, Ulitsa Mira 16, kv. 12, Klin Moskovskoi Oblasti, U.S.S.R.
Filed July 28, 1967, Ser. No. 656,904
Int. Cl. C03b 5/32
U.S. Cl. 65—145                             2 Claims

ABSTRACT OF THE DISCLOSURE

A device for the continuous stretching of glass capillaries with an enamel band, wherein a bath having a forming hole accommodates a vessel for enamel submerged in the glass melt and consisting of two parts—an upper ceramic part and a lower part of metal with a high thermal conductivity, there being a device for introducing the enamel into the capillary being stretched, and another vessel for melting the enamel arranged outside the bath with the glass melt and communicating with the vessel in the bath containing the glass melt.

---

The present invention relates to devices for the continuous stretching of glass articles and, more particularly, to devices for the continuous stretching of glass capillaries with an enamel band.

Known in the art is a device for the continuous stretching of glass capillaries with an enamel band, whose bath for the glass melt employed has a forming hole, said bath also having a vessel for enamel fitted with an arrangement for introducing the enamel into a stretched capillary, as well as an air delivery pipe (cf. the German Pat. No. 25,248).

A disadvantage of this device is that the enamel is melted and clarified in that very vessel from which it is fed to the stretched capillary, air bubbles, as a result, getting into the enamel band introduced into the capillary.

Another disadvantage of the known device is that the enamel-introducing arrangement does not allow the capillary to obtain an enamel band of a required size and shape.

It is an object of the present invention to provide a device which permits obtaining an enamel band of required shape and size inside a capillary.

Another object of the invention is to provide a device which permits a thorough clarification of the enamel.

Still another object of the invention is to provide a device which insures the equalizing of temperatures of both the enamel and the glass melt prior to stretching of the capillaries.

According to these and other objects, the invention consists of a device, for the continuous stretching of glass capillaries with an enamel band having a bath for a glass melt provided with a forming hole, said bath also having a vessel for enamel fitted with an arrangement for introducing the enamel into a stretched capillary, as well as an air-delivery pipe wherein, according to the invention, the vessel for the enamel is made as two intercommunicating tanks, one of which is mounted outside the bath for the glass melt and the other, fitted with an arrangement for introducing the enamel into the capillary, is set on the air-delivery pipe and sunk into the glass melt inside said bath.

It is preferable that the vessel for the enamel in the bath for the glass melt have two parts; an upper one made, preferably, of ceramic material, and a lower one fitted with an arrangement for introducing the enamel into the capillary and made of a material which has a high heat conductivity and precludes sintering It is also preferable to fashion the enamel-introducing arrangement as a pipe, whose one end is connected with the lower part of the vessel sunk in the glass melt and the other end of which is arranged near the lower end of the air-delivery pipe.

The device according to the invention permits obtaining glass capillaries with enamel bands of various sizes and shapes and at certain distances from the capillary channel.

Figure 1:
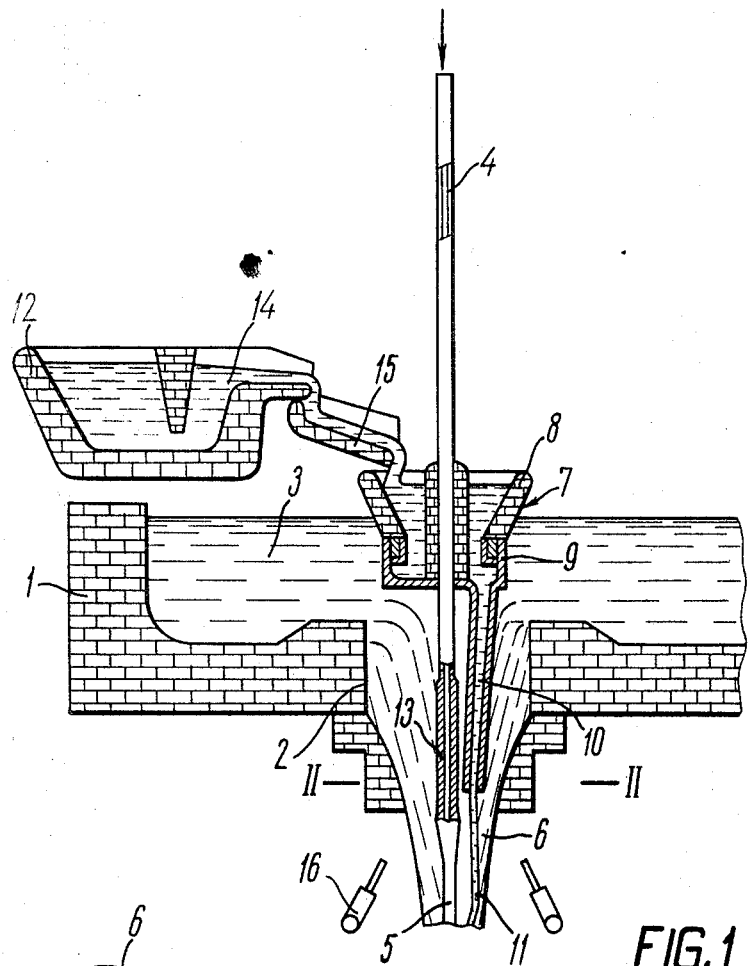
Figure 2:
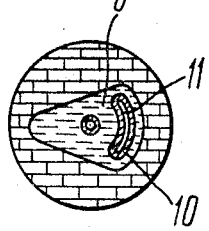

The invention will be more apparent from the following description of an exemplary embodiment thereof and the appended drawings, wherein:

FIG. 1 is a general view of a device for the continuous stretching of glass capillaries with an enamel band, according to the invention; and FIG. 2 is a section on line II—II of FIG. 1.

The illustrated device for the continuous stretching of glass capillaries with an enamel band has a bath 1 (FIG. 1) with a forming hole 2 on its bottom, said bath 1 being filled with glass melt 3.

Inserted into the forming hole 2 is a pipe 4 delivering air for making a hole 5 in a capillary 6, said pipe 4 having a tip 13 and carrying a vessel 7 sunk in the glass melt 3.

The vessel 7 consists of two parts: an upper part 8 made of ceramics and a lower part 9 made of a metal which possesses a high heat conductivity and precludes sintering.

Provided in the lower part of the vessel 7 is an arrangement for introducing enamel, which is fashioned as a pipe 10, whose one end is connected with the lower part 9 of the vessel 7 and the other end of which is arranged near the end of the air-delivery pipe 4.

The pipe 10 has a varying section diminishing in a downward direction, its lower end having a shape and size insuring the required shape and size for the enamel band 11 (FIG. 2).

Another vessel 12 (FIG. 1), wherein the enamel is melted and clarified, is so arranged that its gas space is isolated from the gas space of the bath 1. The vessel 12 communicates with the vessel 7 sunk in the glass melt.

The device operates as follows.

The glass melt 3 flows out through the forming hole 2 provided in the bottom of the bath 1, acquiring the shape and size of this hole. In order to obtain the channel of the capillary 6, air is delivered into the glass melt 3 under a certain pressure through the pipe 4 having the tip 13. The shape and size of the hole in the capillary depends upon the shape and size of the tip 13.

The enamel 14 melted and clarified in the vessel 12 is drained along a chute 15 into the vessel 7. As the vessel 7 is sunk in the glass melt 3, the enamel temperature becomes equal to that of the glass melt.

Passing along the pipe 10, the enamel gets inside the capillary near the lower end of the air-delivery pipe 4. The shape, size and position of the enamel band 11 depend upon the shape, size and position of the end of the pipe 10.

To maintain the constant temperature required for stretching the capillary 6, burners 16 are provided below the forming hole 2.

We claim:
1. A device for the continuous drawing of a glass capillary to be provided with an enamel band, which comprises: a bath for a glass melt including means for forming said capillary; air-delivery means in said bath to form a channel in the capillary being formed; a first vessel for melting and clarifying enamel mounted outside said bath; a second vessel for enamel arranged in said bath and connected with said first vessel, said second vessel being mounted on the said air-delivery means and being immersed in the glass melt inside said bath; and means mounted on said second vessel for introducing the enamel into said capillary, said second vessel including an upper part of a ceramic material resistant to gas medium over the bath and a lower part fitted with said means for introducing the enamel and of material having a high heat conductivity.

2. A device as claimed in claim 1 wherein said second vessel encircles said air-delivery means.

References Cited
UNITED STATES PATENTS

| | | | |
|---|---|---|---|
| 1,463,582 | 7/1923 | Hitchcock | 65—374 |
| 1,920,336 | 8/1933 | Woods | 65—121 |
| 1,920,366 | 8/1933 | De Silva | 65—121 |
| 2,052,269 | 8/1936 | Woods | 65—145 |
| 2,798,336 | 7/1957 | Pappens | 65—121 |

HOWARD R. CAINE, Primary Examiner

J. H. HARMAN, Assistant Examiner

U.S. Cl. X.R.

65—86, 121, 187, 192